United States Patent
Pu et al.

(10) Patent No.: US 11,887,485 B2
(45) Date of Patent: Jan. 30, 2024

(54) CONTROL METHOD AND SYSTEM FOR COLLABORATIVE INTERCEPTION BY MULTIPLE UNMANNED SURFACE VESSELS

(71) Applicants: Shanghai University, Shanghai (CN); Chongqing University, Chongqing (CN)

(72) Inventors: Huayan Pu, Shanghai (CN); Yuan Liu, Shanghai (CN); Jun Luo, Chongqing (CN); Zhijiang Xie, Chongqing (CN); Jiajia Xie, Shanghai (CN); Xiaomao Li, Shanghai (CN); Zhou Su, Shanghai (CN); Yan Peng, Shanghai (CN); Hengyu Li, Shanghai (CN); Shaorong Xie, Shanghai (CN)

(73) Assignees: Shanghai University, Shanghai (CN); Chongqing University, Chongqing (CN)

( * ) Notice: Subject to any disclaimer, the term of this patent is extended or adjusted under 35 U.S.C. 154(b) by 274 days.

(21) Appl. No.: 17/467,916

(22) Filed: Sep. 7, 2021

(65) Prior Publication Data
US 2022/0215758 A1    Jul. 7, 2022

(30) Foreign Application Priority Data
Jan. 6, 2021    (CN) .......................... 202110012035.7

(51) Int. Cl.
*B63B 49/00*    (2006.01)
*G08G 3/00*    (2006.01)
(Continued)

(52) U.S. Cl.
CPC .............. *G08G 3/00* (2013.01); *B63B 49/00* (2013.01); *B63B 79/15* (2020.01); *B63B 79/20* (2020.01);
(Continued)

(58) Field of Classification Search
CPC ......... B63B 79/40; B63B 79/15; B63B 79/20; B63B 49/00; G05D 1/12; G05D 1/0206; G08G 3/00; G05B 13/0265
See application file for complete search history.

(56) References Cited

U.S. PATENT DOCUMENTS

| 7,389,735 | B2 * | 6/2008 | Kaji ........................ | B63B 21/00 114/230.1 |
| 7,883,292 | B2 * | 2/2011 | Thompson .............. | B63B 21/66 405/173 |

(Continued)

OTHER PUBLICATIONS

Svec et al., Dynamics-aware target following for an autonomous surface vehicle operating under COLREGs in civilian traffic, 2013, IEEE, p. 3871-3878 (Year: 2013).*

(Continued)

*Primary Examiner* — McDieunel Marc
(74) *Attorney, Agent, or Firm* — ArentFox Schiff LLP; Michael Fainberg

(57) ABSTRACT

A control method and system for collaborative interception by multiple unmanned surface vessels are provided. The method includes obtaining task environment information of each unmanned surface vessel in an unmanned surface vessel group at a current moment, estimating interception point information of the intruding target at the current moment by using a Kalman filter according to the task environment information of the unmanned surface vessels at the current moment, determining process state information of each unmanned surface vessel at the current moment, inputting the process state information of each unmanned surface vessel at the current moment into a corresponding intruding target interception policy output model respectively to obtain an execution action of each unmanned (Continued)

surface vessel at a next moment to intercept the intruding target. The application can intercept the intruding target accurately.

10 Claims, 3 Drawing Sheets

(51) Int. Cl.
  *B63B 79/15* (2020.01)
  *B63B 79/40* (2020.01)
  *B63B 79/20* (2020.01)
  *G05B 13/02* (2006.01)
  *G05D 1/02* (2020.01)

(52) U.S. Cl.
  CPC .......... *B63B 79/40* (2020.01); *G05B 13/0265* (2013.01); *G05D 1/0206* (2013.01)

(56) References Cited

U.S. PATENT DOCUMENTS

| | | | | |
|---|---|---|---|---|
| 8,701,718 | B1* | 4/2014 | Turiello | G08B 21/18 |
| | | | | 141/2 |
| 8,944,865 | B1* | 2/2015 | Krabacher | B63H 21/21 |
| | | | | 440/1 |
| 10,793,245 | B1* | 10/2020 | Trotter | G08B 7/06 |
| 2010/0054078 | A1* | 3/2010 | Thompson | B63B 35/04 |
| | | | | 367/20 |
| 2020/0363798 | A1* | 11/2020 | Harnett | B64D 47/02 |

OTHER PUBLICATIONS

Sun et al., Collision Avoidance of Podded Propulsion Unmanned Surface Vehicle With COLREGs Compliance and Its Modeling and Identification, 2018, IEEE, p. 55473-55491 (Year: 2018).*
Han et al., Research on Alert Strategy of Unmanned surface Vessel Based on Typical Missions, 2019, IEEE, p. 412-417 (Year: 2019).*
Meyer et al., COLREG-Compliant Collision Avoidance for Unmanned Surface Vehicle Using Deep Reinforcement Learning, 2020, IEEE, p. 165344-165364 (Year: 2020).*

* cited by examiner

CONTROL METHOD AND SYSTEM FOR COLLABORATIVE INTERCEPTION BY MULTIPLE UNMANNED SURFACE VESSELS

CROSS REFERENCE TO RELATED APPLICATION

This patent application claims the benefit and priority of Chinese Patent Application No. 202110012035.7 filed on Jan. 6, 2021, the disclosure of which is incorporated by reference herein in its entirety as part of the present application.

TECHNICAL FIELD

The present disclosure relates to a technical field of a collaborative operation of marine intelligent unmanned surface vessels, in particular to a control method and system for collaborative interception by multiple unmanned surface vessels.

BACKGROUND

Owning to the advantages of a small size, strong mobility, a low cost, high safety and no casualties to traditional ships, the unmanned surface vessels have attracted a wide attention in various maritime tasks, among which maritime escort has become one of the application scenarios of the unmanned surface vessels.

Although the unmanned surface vessel group (a system composed of multiple unmanned surface vessels) can greatly expand the scope of maritime operations and complete complex tasks, now only a single unmanned surface vessel is usually used for collaborative maritime escort. Therefore, there is an urgent need for a control method to realize the collaborative escort by the unmanned surface vessel group.

SUMMARY

The present disclosure intends to provide a control method and system for collaborative interception by multiple unmanned surface vessels, which can accurately intercept corresponding intruding targets.

To achieve the above effect, the disclosure provides the following solutions.

A control method for collaborative interception by multiple unmanned surface vessels includes:

obtaining task environment information of each unmanned surface vessel in an unmanned surface vessel group at a current moment; the task environment information includes position information of the unmanned surface vessel, velocity information of the unmanned surface vessel, relative position information between the unmanned surface vessel and an intruding target, and relative velocity information between the unmanned surface vessel and the intruding target; each unmanned surface vessel corresponds to an intruding target interception policy output model; and the intruding target interception policy output model is obtained by training a multi-agent deep deterministic policy gradient network structure based on a training sample;

estimating interception point information of the intruding target at the current moment by using a Kalman filter according to the task environment information of all unmanned surface vessels at the current moment; the interception point information includes a predicted position of the intruding target and a predicted velocity of the intruding target;

determining process state information of each unmanned surface vessel at the current moment; the process state information includes the position information of the unmanned surface vessel, the velocity information of the unmanned surface vessel and the interception point information of the intruding target; and inputting the process state information of each unmanned surface vessel at the current moment into a corresponding intruding target interception policy output model respectively to obtain an execution action of each unmanned surface vessel at a next moment, and sending the execution action to an execution structure of a corresponding unmanned surface vessel to intercept the intruding target.

In an embodiment, before performing obtaining the task environment information of each unmanned surface vessel in the unmanned surface vessel group at the current moment, the control method further includes:

determining whether there is an intruding target in a navigation area corresponding to the unmanned surface vessel group at the current moment;

when there is not an intruding target in the navigation area corresponding to the unmanned surface vessel group at the current moment, determining whether there is an intruding target in a navigation area corresponding to the unmanned surface vessel group at the next moment; and when there is an intruding target in the navigation area corresponding to the unmanned surface vessel group at the current moment, obtaining the task environment information of each unmanned surface vessel in the unmanned surface vessel group at the current moment.

In an embodiment, the estimating the interception point information of the intruding target at the current moment by using Kalman filter according to the task environment information of all unmanned surface vessels at the current moment specifically includes:

determining predicted interception point information of the intruding target at the current moment by using the Kalman filter according to interception point information of the intruding target at a previous moment;

abstracting all unmanned surface vessels into particles moving on a two-dimensional plane, and determining a position measurement value and a velocity measurement value of the intruding target in a Cartesian coordinate system according to the task environment information of all unmanned surface vessels at the current moment; and correcting the predicted interception point information of the intruding target at the current moment by using the Kalman filter according to the position measurement value and the velocity measurement value to determine the interception point information of the intruding target at the current moment.

In an embodiment, constructing the intruding target interception policy output model includes:

determining a training sample of an $i^{th}$ unmanned surface vessel; where the training sample is data set continuous in time; the data set includes multiple sample sets; each e sample set includes multiple elements, which are respectively process state information at the current moment, an execution action at the current moment, a reward at the current moment and process state information at the next moment;

constructing the multi-agent deep deterministic policy gradient network structure; and inputting the training samples of the $i^{th}$ unmanned surface vessel into the multi-agent deep deterministic policy gradient network structure to train the multi-agent deep deterministic policy gradient network structure, so as to obtain the intruding target interception policy output model corresponding to the $i^{th}$ unmanned surface vessel, and thus obtain the intruding target interception policy output model corresponding to each unmanned surface vessel.

In an embodiment, the determining the training sample of the $i^{th}$ unmanned surface vessel includes:

obtaining task environment information of each unmanned surface vessel in the unmanned surface vessel group at a $t^{th}$ moment;

estimating interception point information of the intruding target at the $t^{th}$ moment by using the Kalman filter according to the task environment information of all unmanned surface vessels at the $t^{th}$ moment; where the interception point information includes the predicted position of the intruding target and the predicted velocity of the intruding target;

determining process state information of the $i^{th}$ unmanned surface vessel at the $t^{th}$ moment according to the task environment information of the $i^{th}$ unmanned surface vessel at the $t^{th}$ moment and the interception point information of the intruding target at the $t^{th}$ moment;

obtaining an execution action of the $i^{th}$ unmanned surface vessel at the $t^{th}$ moment;

calculating a reward of the $i^{th}$ unmanned surface vessel at the $t^{th}$ moment according to a formula of $$r_1 = \min_{b_j}(y'_{u_i,b_j}(t) - y'_{u_i,b_j}(t+1));$$

where $r_1$ is the reward of the $i^{th}$ unmanned surface vessel at the $t^{th}$ moment, $u_i$ is the $i^{th}$ unmanned surface vessel, $b_j$ is a j-th intruding target, $y'_{u_i,b_j}(t)$ is a distance between the $j^{th}$ intruding target and the $i^{th}$ unmanned surface vessel at the $t^{th}$ moment, $y'_{u_i,b_j}(t+1)^{th}$ is a distance between the $j^{th}$ intruding target and the $i^{th}$ unmanned surface vessel at a $(t+1)^{th}$ moment;

obtaining task environment information of each unmanned surface vessel in the unmanned surface vessel group at the (t+1)th moment;

estimating interception point information of the intruding target at the $(t+1)^{th}$ moment by using the Kalman filter according to the task environment information of all unmanned surface vessels at the (t+1)th moment; the interception point information includes the predicted position of the intruding target and the predicted velocity of the intruding target;

determining process state information of the $i^{th}$ unmanned surface vessel at the $(t+1)^{th}$ moment according to the task environment information of the $i^{th}$ unmanned surface vessel at the (t+1)th moment and the interception point information of the intruding target at the (t+1)th the moment;

combining the process state information of the $i^{th}$ unmanned surface vessel at the $t^{th}$ moment, the execution action of the $i^{th}$ unmanned surface vessel at the $t^{th}$ moment, the reward of the $i^{th}$ unmanned surface vessel at the $t^{th}$ moment, and the process state information of the $i^{th}$ unmanned surface vessel at the $(t+1)^{th}$ moment into a sample set of the $i^{th}$ unmanned surface vessel at the $t^{th}$ moment;

storing the sample set of the $i^{th}$ unmanned surface vessel at the $t^{th}$ moment in an experience pool; and stopping storing when data stored in the experience pool reach a set amount; where the data in the experience pool after stopping storing are the training sample of the $i^{th}$ unmanned surface vessel.

A control system for collaborative interception by multiple unmanned surface vessels includes:

a current moment task environment information obtaining module, configured to obtain task environment information of each unmanned surface vessel in an unmanned surface vessel group at a current moment; where the task environment information includes position information of the unmanned surface vessel, velocity information of the unmanned surface vessel, relative position information between the unmanned surface vessel and an intruding target, and relative velocity information between the unmanned surface vessel and the intruding target; each unmanned surface vessel corresponds to an intruding target interception policy output model; and the intruding target interception policy output model is obtained by training a multi-agent deep deterministic policy gradient network structure based on a training sample;

a current moment interception point information estimating module, configured to estimate interception point information of the intruding target at the current moment by using the Kalman filter according to the task environment information of all unmanned surface vessels at the current moment; the interception point information includes a predicted position of the intruding target and a predicted velocity of the intruding target;

a current moment process state information determining module, configured to determine process state information of each unmanned surface vessel at the current moment; where the process state information includes the position information of the unmanned surface vessel, the velocity information of the unmanned surface vessel and the interception point information of the intruding target; and an intruding target interception module, configured to input the process state information of each unmanned surface vessel at the current moment into a corresponding intruding target interception policy output model respectively to obtain an execution action of each unmanned surface vessel at a next moment, and send the execution action to an execution structure of a corresponding unmanned surface vessel to intercept the intruding target.

In an embodiment, the control system further includes:

a current moment determining module, configured to determine whether there is an intruding target in a navigation area corresponding to the unmanned surface vessel group at the current moment;

a next moment determining module, configured to determine whether there is an intruding target exists in a navigation area corresponding to the unmanned surface vessel group at the next moment when there is not an intruding target in the navigation area corresponding to the unmanned surface vessel group at the current moment;

a jumping module, configured to enter the current moment task environment information obtaining module when there is an intruding target in the navigation area corresponding to the unmanned surface vessel group at the current moment.

In an embodiment, the current moment interception point information estimating module includes:

a current moment prediction interception point information determining unit, configured to determine predicted interception point information of the intruding target at the current moment by using the Kalman filter according to interception point information of the intruding target at a previous moment;

a current moment measurement value determining unit, configured to abstract all unmanned surface vessels into particles moving on a two-dimensional plane, and determine a position measurement value and a velocity measurement value of the intruding target in the Cartesian coordinate system according to the task environment information of all unmanned surface vessels at the current moment; and a current moment interception point information estimating unit, configured to correct the predicted interception point information of the intruding target at the current moment by using the Kalman filter according to the position measurement value and the velocity measurement value to determine the interception point information of the intruding target at the current moment.

In an embodiment, the control system further includes an intruding target interception policy output model constructing module, where the intruding target interception policy output model constructing module includes:

a training sample determining unit, configured to determine a training sample of an $i^{th}$ unmanned surface vessel; the training sample is a data set continuous in time; the data set includes multiple sample sets; each sample set includes multiple elements, which are respectively process state information at the current moment, the execution action at the current moment, a reward at the current moment and process state information at the next moment;

a network structure constructing unit, configured to construct the multi-agent deep deterministic policy gradient network structure;

an intruding target interception policy output model constructing unit, configured to input the training sample of the $i^{th}$ unmanned surface vessel into the multi-agent deep deterministic policy gradient network structure to train the multi-agent deep deterministic policy gradient network structure, so as to obtain the intruding target interception policy output model corresponding to the $i^{th}$ unmanned surface vessel, and thus obtain the intruding target interception policy output model corresponding to each unmanned surface vessel.

In an embodiment, the training sample determining unit specifically includes:

a $t^{th}$ moment task environment information obtaining subunit, configured to obtain task environment information of each of the unmanned surface vessels in the unmanned surface vessel group at a $t^{th}$ moment;

a $t^{th}$ moment interception point information estimating subunit, configured to estimate interception point information of the intruding target at the $t^{th}$ moment by using the Kalman filter according to the task environment information of all unmanned surface vessels at the $t^{th}$ moment; where the interception point information includes the predicted position of the intruding target and the predicted velocity of the intruding target;

a $t^{th}$ moment process state information determining subunit, configured to determine process state information of the $i^{th}$ unmanned surface vessel at the $t^{th}$ moment according to the task environment information of the $i^{th}$ unmanned surface vessel at the $t^{th}$ moment and the interception point information of the intruding target at the $t^{th}$ moment;

a $t^{th}$ moment execution action obtaining subunit, configured to obtain an execution action of the $i^{th}$ unmanned surface vessel at the $t^{th}$ moment;

a $t^{th}$ moment reward obtaining subunit, configured to calculate a reward of the $i^{th}$ unmanned surface vessel at the $t^{th}$ moment according to a formula of $$r_1 = \min_{b_j}(y'_{u_i,b_j}(t) - y'_{u_i,b_j}(t+1));$$

wherein $r_1$ is the reward of the $i^{th}$ unmanned surface vessel at the $t^{th}$ moment, $u_i$ is the $i^{th}$ unmanned surface vessel, $b_j$ is the $j^{th}$ intruding target, $y'_{u_i,b_j}(t)$ is a distance between the $j^{th}$ intruding target and the $i^{th}$ unmanned surface vessel at the $t^{th}$ moment, $y'_{u_i,b_j}(t+1)$ is a distance between the $j^{th}$ intruding target and the $i^{th}$ unmanned surface vessel at a $(t+1)$th moment;

a $(t+1)^{th}$ moment task environment information obtaining subunit, configured to obtain task environment information of each unmanned surface vessel in the unmanned surface vessel group at the $(t+1)^{th}$ moment;

a $(t+1)^{th}$ moment interception point information estimating subunit, configured to estimate interception point information of the intruding target at the $(t+1)^{th}$ moment by using the Kalman filter according to the task environment information of all unmanned surface vessels at the $(t+1)^{th}$ moment; where the interception point information includes the predicted position of the intruding target and the predicted velocity of the intruding target;

a $(t+1)^{th}$ moment process state information determining subunit, configured to determine process state information of the $i^{th}$ unmanned surface vessel at the $(t+1)^{th}$ moment according to the task environment information of the $i^{th}$ unmanned surface vessel at the $(t+1)^{th}$ moment and the interception point information of the intruding target at the $(t+1)^{th}$ moment;

a $t^{th}$ moment sample set determining subunit, configured to combine the process state information of the $i^{th}$ unmanned surface vessel at the $t^{th}$ moment, the execution action of the $i^{th}$ unmanned surface vessel at the $t^{th}$ moment, the reward of the $i^{th}$ unmanned surface vessel at the $t^{th}$ moment, and the process state information of the $i^{th}$ unmanned surface vessel at the $(t+1)^{th}$ moment into a sample set of the $i^{th}$ unmanned surface vessel at the $t^{th}$ moment;

a storing unit, configured to store the sample set of the $i^{th}$ unmanned surface vessel at the $t^{-th}$ moment in an experience pool; and a training sample determining subunit, configured to stop storing when data stored in the experience pool reach a set amount; where the data in the experience pool after stopping storing are the training sample of the $i^{th}$ unmanned surface vessel.

According to the specific embodiments provided by the disclosure, the disclosure has following technical effects:

The disclosure realizes an accurate collaborative interception of intruding targets by multiple unmanned surface vessels via the Kalman filter and the multi-agent deep deterministic policy gradient algorithm.

BRIEF DESCRIPTION OF THE DRAWINGS

In order to explain technical solutions of embodiments of the present disclosure or the conventional art more clearly, drawings used in the embodiments will be briefly described as follows. Obviously, the drawings described below are only some embodiments of the present disclosure, and for those of ordinary skill in the art, other drawings can be obtained based on the drawings without any inventive effort.

DETAILED DESCRIPTION OF THE DRAWINGS

Technical solutions in the embodiments of the present disclosure will be clearly and completely described below with reference to the drawings in the embodiments of the present disclosure. Obviously, the described embodiments are only a part of the embodiments of the present disclosure, not all of them. Other embodiments obtained by those skilled in the art without any creative efforts shall fall within the scope of the disclosure.

The disclosure intends to provide a control method and a system for collaborative interception by multiple unmanned surface vessels, aiming at solving problems of a low interception success rate and an unclear task allocation in existing unmanned surface vessel interception task. The disclosure gives full play to the advantages and characteristics of the unmanned surface vessel group in the maritime escort tasks.

In order to make the above purposes, features and advantages of the disclosure more obvious and easier to understand, the disclosure will be further described below in detail in combination with the drawings and the specific embodiments.

The disclosure provides a control method and a system for collaborative interception by multiple unmanned surface vessels, in which a high-value ship (such as a mother ship) is escorted by intercepting hostile intruding ships in a complex marine environment with other ships and obstacles.

Embodiment 1

The present embodiment provides a control method for collaborative interception by multiple unmanned surface vessels, in which all unmanned surface vessels in the unmanned surface vessel group cooperate and are assigned tasks, so as to maximize performance of each unmanned surface vessel in the unmanned surface vessel group.

Figure 1:
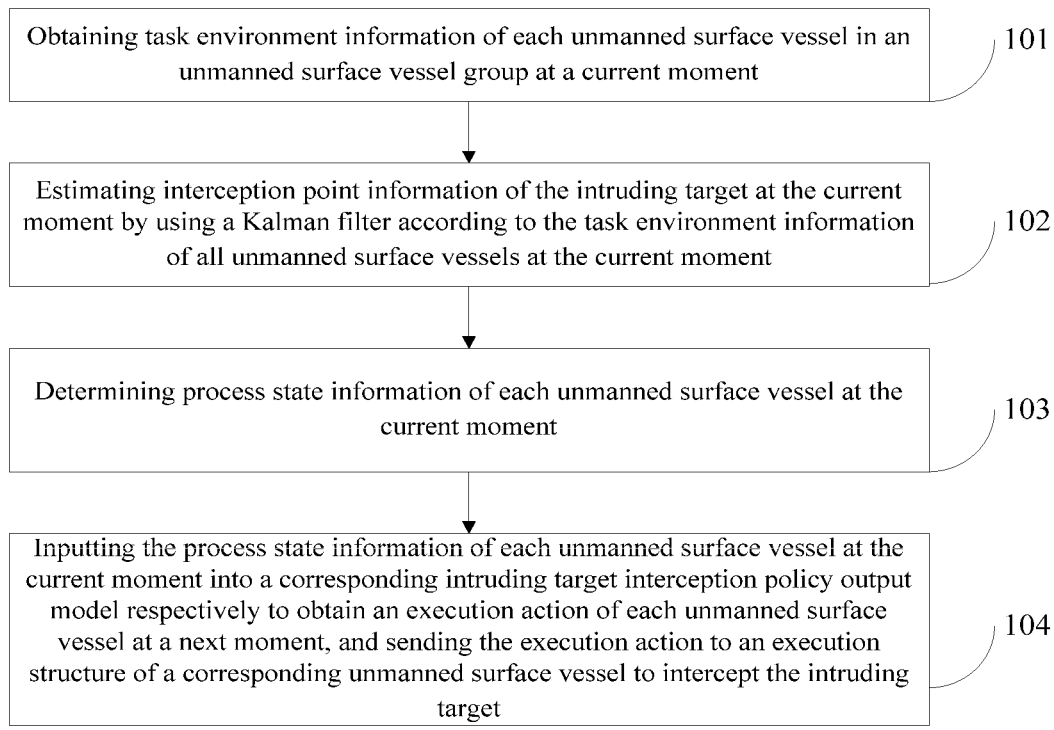
FIG. 1 is a schematic flow diagram of a control method for collaborative interception by multiple unmanned surface vessels according to the disclosure.

As shown in FIG. 1, a control method for collaborative interception by the multiple unmanned surface vessels provided by the present embodiment includes following steps.

Step 101: obtaining task environment information of each unmanned surface vessel in an unmanned surface vessel group at a current moment, wherein, the task environment information includes position information of the unmanned surface vessel, velocity information of the unmanned surface vessel, relative position information between the unmanned surface vessel and an intruding target, and relative velocity information between the unmanned surface vessel and the intruding target; each unmanned surface vessel corresponds to an intruding target interception policy output model; and the intruding target interception policy output model is obtained by training a multi-agent deep deterministic policy gradient network structure based on a training sample;

Step 102: estimating interception point information of the intruding target at the current moment by using a Kalman filter according to the task environment information of all the unmanned surface vessels at the current moment. The interception point information includes a predicted position of the intruding target and a predicted velocity of the intruding target;

Step 103: determining process state information of each unmanned surface vessel at the current moment, wherein, the process state information includes the position information of the unmanned surface vessel, the velocity information of the unmanned surface vessel and the interception point information of the intruding target; and Step 104: inputting the process state information of each unmanned surface vessel at the current moment into a corresponding intruding target interception policy output model respectively to obtain an execution action of each unmanned surface vessel at a next moment, and sending the execution action to an execution structure of a corresponding unmanned surface vessel to intercept the intruding target.

In an embodiment, before performing Step 101, the present embodiment further includes:

determining whether there is an intruding target in a navigation area corresponding to the unmanned surface vessel group at the current moment; when there is not an intruding target in the navigation area corresponding to the unmanned surface vessel group at the current moment, determining whether there is an intruding target in a navigation area corresponding to the unmanned surface vessel group at the next moment; and when there is an intruding target in the navigation area corresponding to the unmanned surface vessel group at the current moment, performing the step 101.

In an embodiment, Step 102 described in the present embodiment specifically includes:

determining predicted interception point information of the intruding target at the current moment by using the Kalman filter according to interception point information of the intruding target at a previous moment;

abstracting all unmanned surface vessels into particles moving on a two-dimensional plane, and determining a position measurement value and a velocity measurement value of the intruding target in a Cartesian coordinate system according to the task environment information of all unmanned surface vessels at the current moment; and correcting the predicted interception point information of the intruding target at the current moment by using the Kalman filter according to the position measurement value and the velocity measurement value to determine the interception point information of the intruding target at the current moment.

In an embodiment, constructing the intruding target interception policy output model described in the present disclosure includes:

determining a training sample of the $i^{th}$ unmanned surface vessel; the training sample is a data set continuous in time; the data set includes multiple sample sets; each sample set includes multiple elements, which are respectively the process state information at the current moment, an execution action at the current moment, a reward at the current moment and process state information at the next moment;

constructing the multi-agent deep deterministic policy gradient network structure; and inputting the training sample of the $i^{th}$ unmanned surface vessel into the multi-agent deep deterministic policy gradient network structure to train the multi-agent deep deterministic policy gradient network structure, so as to obtain the intruding target interception policy output model corresponding to the $i^{th}$ unmanned surface vessel, and thus obtain the intruding target interception policy output model corresponding to each unmanned surface vessel.

Wherein, the determining the training sample of the $i^{th}$ unmanned surface vessel includes:

obtaining task environment information of each unmanned surface vessel in the unmanned surface vessel group at the $t^{th}$ moment;

estimating interception point information of the intruding target at the $t^{th}$ moment by using the Kalman filter according to the task environment information of all unmanned surface vessels at the $t^{th}$ moment; wherein, the interception point information includes the predicted position of the intruding target and the predicted velocity of the intruding target;

determining process state information of the $i^{th}$ unmanned surface vessel at the $t^{th}$ moment according to the task environment information of the $i^{th}$ unmanned surface vessel at the $t^{th}$ moment and the interception point information of the intruding target at the $t^{th}$ moment;

obtaining an execution action of the $i^{th}$ unmanned surface vessel at the $t^{th}$ moment;

calculating a reward of the $i^{th}$ unmanned surface vessel at the $t^{th}$ moment according to a formula of $$r_1 = \min_{b_j}(y'_{u_i,b_j}(t) - y'_{u_i,b_j}(t+1));$$

where $r_1$ is the reward of the $i^{th}$ unmanned surface vessel at the $t^{th}$ moment, u is the $i^{th}$ unmanned surface vessel, $b_j$ is the $j^{th}$ intruding target, $y'_{u_i,b_j}(t)$ is a distance between the $j^{th}$ intruding target and the $i^{th}$ unmanned surface vessel at the $t^{th}$ moment, $y'_{u_i,b_j}(t+1)$ is a distance between the $j^{th}$ intruding target and the $i^{th}$ unmanned surface vessel at a $(t+1)^{th}$ moment;

obtaining task environment information of each unmanned surface vessel in the unmanned surface vessel group at the $(t+1)^{th}$ moment;

estimating interception point information of the intruding target at the $(t+1)^{th}$ moment by using the Kalman filter according to the task environment information of all unmanned surface vessels at the $(t+1)^{th}$ moment; wherein, the interception point information includes the predicted position of the intruding target and the predicted velocity of the intruding target;

determining process state information of the $i^{th}$ unmanned surface vessel at the $(t+1)^{th}$ moment according to the task environment information of the $i^{th}$ unmanned surface vessel at the $(t+1)^{th}$ moment and the interception point information of the intruding target at the $(t+1)^{th}$ moment;

combining the process state information of the $i^{th}$ unmanned surface vessel at the $t^{th}$ moment, the execution action of the $i^{th}$ unmanned surface vessel at the $t^{th}$ moment, the reward of the $i^{th}$ unmanned surface vessel at the $t^{th}$ moment, and the process state information of the $i^{th}$ unmanned surface vessel at the $(t+1)^{th}$ moment into a sample set of the $i^{th}$ unmanned surface vessel at the $t^{th}$ moment;

storing the sample set of the $i^{th}$ unmanned surface vessel at the $t^{th}$ moment in an experience pool; and stopping storing when data stored in the experience pool reach a set amount; the data in the experience pool after stopping storing are the training sample of the $i^{th}$ unmanned surface vessel.

Embodiment 2

Figure 2:
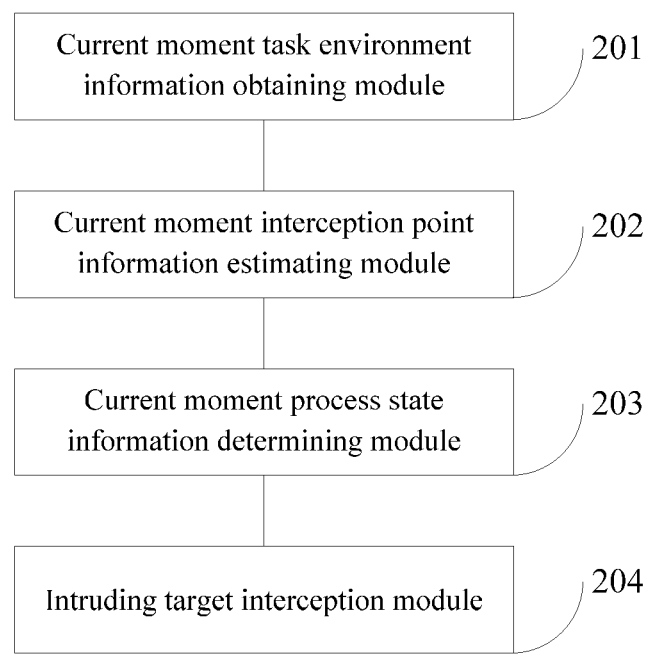
FIG. 2 is a schematic structure diagram of a control system for collaborative interception by multiple unmanned surface vessels according to the disclosure.

As shown in FIG. 2, a control system for collaborative interception by multiple unmanned surface vessels provided by the present embodiment includes:

a current moment task environment information obtaining module 201, configured to obtain task environment information of each unmanned surface vessel in an unmanned surface vessel group at a current moment; the task environment information includes position information of the unmanned surface vessel, velocity information of the unmanned surface vessel, relative position information between the unmanned surface vessel and an intruding target, and relative velocity information between the unmanned surface vessel and the intruding target; each unmanned surface vessel corresponds to an intruding target interception policy output model; and the intruding target interception policy output model is obtained by training a multi-agent deep deterministic policy gradient network structure based on a training sample;

a current moment interception point information estimating module 202, configured to estimate interception point information of the intruding target at the current moment by using a Kalman filter according to the task environment information of all unmanned surface vessels at the current moment; the interception point information includes a predicted position of the intruding target and a predicted velocity of the intruding target;

a current moment process state information determining module 203, configured to determine process state information of each unmanned surface vessel at the current moment; the process state information includes the position information of the unmanned surface vessel, the velocity information of the unmanned surface vessel and the interception point information of the intruding target; and an intruding target interception module 204, configured to input the process state information of each unmanned surface vessel at the current moment into a corresponding intruding target interception policy output model respectively to obtain an execution action of each unmanned surface vessel at a next moment, and send the execution action to an execution structure of a corresponding unmanned surface vessel to intercept the intruding target.

In an embodiment, the control system for collaborative interception by multiple unmanned surface vessels provided by the present embodiment further includes:

a current moment determining module, configured to determine whether there is an intruding target in a navigation area corresponding to the unmanned surface vessel group at the current moment;

a next moment determining module, configured to determine whether there is an intruding target in a navigation area corresponding to the unmanned surface vessel group at the next moment when there is not an intruding target in the navigation area corresponding to the unmanned surface vessel group at the current moment; and a jumping module, configured to enter the current moment task environment information obtaining module when there is an intruding target in the navigation area corresponding to the unmanned surface vessel group at the current moment.

In an embodiment, the current moment interception point information estimating module 202 described in the present embodiment specifically includes:

a current moment prediction interception point information determining unit, configured to determine predicted interception point information of the intruding target at the current moment by using the Kalman filter according to interception point information of the intruding target at a previous moment;

a current moment measurement value determining unit, configured to abstract all unmanned surface vessels into particles moving on a two-dimensional plane, and determine a position measurement value and a velocity measurement value of the intruding target in the Cartesian coordinate system according to the task environment information of all unmanned surface vessels at the current moment; and a current moment interception point information estimating unit, configured to correct the predicted interception point information of the intruding target at the current moment by using the Kalman filter according to the position measurement value and the velocity measurement value to determine the interception point information of the intruding target at the current moment.

In an embodiment, the control system provided in the present embodiment further includes an intruding target interception policy output model constructing module, and the intruding target interception policy output model constructing module includes:

a training sample determining unit, configured to determine a training sample of an $i^{th}$ unmanned surface vessel; the training sample is a data set continuous in time; the data set includes multiple sample sets; each sample set includes multiple elements, which are respectively process state information at the current moment, an execution action at the current moment, a reward at the current moment and process state information at the next moment;

a network structure constructing unit, configured to construct the multi-agent deep deterministic policy gradient network structure;

an intruding target interception policy output model constructing unit, configured to input the training sample of the $i^{th}$ unmanned surface vessel into the multi-agent deep deterministic policy gradient network structure to train the multi-agent deep deterministic policy gradient network structure, so as to obtain the intruding target interception policy output model corresponding to the $i^{th}$ unmanned surface vessel, and thus obtain the intruding target interception policy output model corresponding to each unmanned surface vessel.

Wherein, the training sample determining unit specifically includes:

a $t^{th}$ moment task environment information obtaining subunit, configured to obtain task environment information of each unmanned surface vessel in the unmanned surface vessel group at the $t^{th}$ moment;

a $t^{th}$ moment interception point information estimating subunit, configured to estimate interception point information of the intruding target at the $t^{th}$ moment by using the Kalman filter according to the task environment information of all unmanned surface vessels at the $t^{th}$ moment; the interception point information includes the predicted position of the intruding target and the predicted intruding target velocity;

a t-th moment process state information determining subunit, configured to determine process state information of the $i^{th}$ unmanned surface vessel at the $t^{th}$ moment according to the task environment information of the $i^{th}$ unmanned surface vessel at the $t^{th}$ moment and the interception point information of the intruding target at the $t^{th}$ moment;

a $t^{th}$ moment execution action obtaining subunit, configured to obtain an execution action of the $i^{th}$ unmanned surface vessel at the $t^{th}$ moment;

a $t^{th}$ moment reward obtaining subunit, configured to calculate a reward of the $i^{th}$ unmanned surface vessel at the $t^{th}$ moment according to a formula of $$r_1 = \min_{b_j}(y'_{u_i,b_j}(t) - y'_{u_i,b_j}(t+1));$$

wherein $r_1$ is the reward of the $i^{th}$ unmanned surface vessel at the $t^{th}$ moment, u is the $i^{th}$ unmanned surface vessel, $b_j$ is the $j^{th}$ intruding target, $y'_{u_i,b_j}(t)$ is a distance between the $j^{th}$ intruding target and the $i^{th}$ unmanned surface vessel at the $t^{th}$ moment, $y'_{u_i,b_j}(t+1)$ is a distance between the $j^{th}$ intruding target and the $i^{th}$ unmanned surface vessel at a $(t+1)^{th}$ moment;

a $(t+1)^{th}$ moment task environment information obtaining subunit, configured to obtain task environment information of each unmanned surface vessel in the unmanned surface vessel group at the $(t+1)^{th}$ moment;

a $(t+1)^{th}$ moment interception point information estimating subunit, configured to estimate the interception point information of the intruding target at the $(t+)^{th}$ moment by using Kalman filter according to the task environment information of all the unmanned surface vessels at the $(t+1)^{th}$ moment; the interception point information includes a predicted position of the intruding target and a predicted velocity of the intruding target;

a $(t+1)^{th}$ moment process state information determining subunit, configured to determine the process state information of the $i^{th}$ unmanned surface vessel at the $(t+)^{th}$ moment according to the task environment information of the $i^{th}$ unmanned surface vessel at the $(t+1)^{th}$ moment and the interception point information of the intruding target at the $(t+1)^{th}$ moment;

a $t^{th}$ moment sample set determining subunit, configured to combine the process state information of the $i^{th}$ unmanned surface vessel at the $t^{th}$ moment, the execution action of the $i^{th}$ unmanned surface vessel at the $t^{th}$ moment, the reward of the $i^{th}$ unmanned surface vessel at the $t^{th}$ moment, and the process state information of the $i^{th}$ unmanned surface vessel at the $(t+1)^{th}$ moment into a sample set of the $i^{th}$ unmanned surface vessel at the $t^{th}$ moment;

a storing unit, configured to store the sample set of the $i^{th}$ unmanned surface vessel at the $t^{th}$ moment in an experience pool; and a training sample determining subunit, configured to stop storing when data stored in the experience pool reach a set amount; the data in the experience pool after stopping storing are the training sample of the $i^{th}$ unmanned surface vessel.

Embodiment 3

The control method for collaborative interception by multiple unmanned surface vessels provided by the present embodiment adopts distributed training and centralized learning, in which the unmanned surface vessel in the unmanned surface vessel group gets the policy of intercepting the intruding target and protecting the high-value ship by using information sharing and information learning. Specifically, firstly, the interception point information of the intruding target is determined, and then the corresponding interception policy is learned by a reinforcement learning method according to the interception point information of the intruding target, so as to realize the interception of the intruding target.

The control method for collaborative interception by multiple unmanned surface vessels provided by this embodiment includes two parts, one is the determination of interception point information of the intruding target, and the other is the learning of the interception policy.

1. Determination of the Interception Point Information of the Intruding Target

All unmanned surface vessels are abstracted as particles moving on a two-dimensional plane. According to the task environment information, such as the position information of the unmanned surface vessel, the velocity information of the unmanned surface vessel, information about whether the intruding target is detected, the relative position information between the unmanned surface vessel and the intruding target, and the relative velocity information between the unmanned surface vessel and the intruding target, collected by the sensors carried by each unmanned surface vessel and by sharing the task environment information among the unmanned surface vessels, the position measurement value and velocity measurement value of the intruding target in the Cartesian coordinate system are determined, and then the interception point information of the intruding target is predicted by using the Kalman filter.

Figure 3:
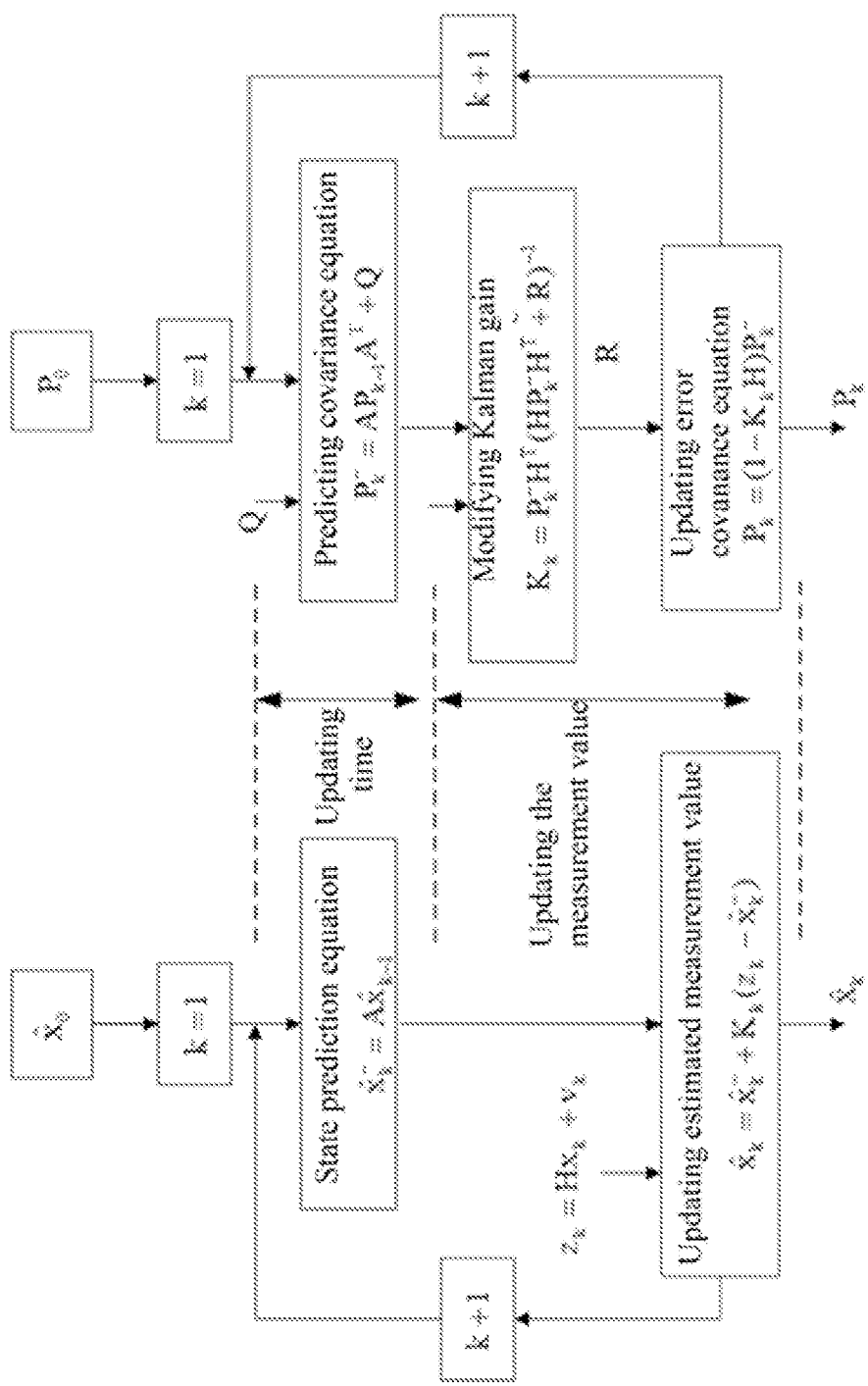
FIG. 3 is a schematic diagram of a working process of the Kalman filter according to the disclosure.

The prediction of interception point information of the intruding target includes steps of time update and measurement update. The step of time update serves as the prediction equation, as shown in the left half of FIG. 3, which can predict the interception point information of the intruding target in time, while the step of measurement update serves as the measurement equation, which can correct the interception point information of the intruding target through the measured values obtained at that time, as shown in the right half of FIG. 3.

The Kalman filter equation includes an initial state value $\hat{x}_0$, a process state value $x_k$, a process state prediction value $\hat{x}_k$, a Kalman gain $K_k$, a conversion matrix A, a measurement matrix H, a process noise covariance Q, a measurement noise covariance R, an initial error covariance $P_0$ and an error covariance $P_k$.

In the present embodiment, the unmanned surface vessels are abstracted into particles moving on a two-dimensional plane. At this stage, the unmanned surface vessel estimates the process state information of each intruding target $b_j$, that is, the interception point information $x_k$ [$x_{b_j}$, $y_{b_j}$, $v_{b_j}^{surge}$, $v_{b_j}^{sway}$], through the update equation of the Kalman filter in FIG. 3, where $p_{b_j}=(x_{b_j}, y_{b_j})$ and $v_{b_j}=(v_{b_j}^{surge}, v_{b_j}^{sway})$ are the predicted position and predicted velocity of the intruding target respectively.

2. Learning of the Interception Policy

In the present embodiment, the multi-agent deep deterministic policy gradient (MADDPG) algorithm is used to train the unmanned surface vessel group to learn the corresponding interception policy.

Taking a certain unmanned surface vessel as an example, this embodiment defines a training unit in the training process as <S, A, R, $S_{next}$>. S represents the process state value of the unmanned surface vessel, which includes the velocity and position of the unmanned surface vessel, as well as the interception point information of the intruding target. A represents an action set of the unmanned surface vessel. R is a reward obtained by the unmanned surface vessel after performing corresponding actions. $S_{next}$ represents the updated process state value of the unmanned surface vessel after performing actions.

At the beginning of training, at each time step, the unmanned surface vessel selects an action A according to a random policy, and gets a reward $r_1$ according to a corresponding reward function, then the next state of the unmanned surface vessel $S_{next}$ is obtained, and then the training unit <S, A, R, $S_{next}$> is stored in the experience pool sequentially. When the data in the experience pool reach a certain amount, the data in the experience pool is randomly taken out to train the MADDPG network structure in order maximize the reward of the unmanned surface vessel, and then obtain the intruding target interception policy output model corresponding to the unmanned surface vessel. According to the process state value S, the corresponding action value A, i.e. the corresponding collaborative interception policy, will be fed back to the unmanned surface vessel by the intruding target interception policy output model corresponding to the unmanned surface vessel.

The MADDPG algorithm has a demonstration and evaluation architecture, which can output the corresponding actions to the unmanned surface vessels according to the state value, and can also constantly modify the network parameters according to the reward obtained from the output actions, so as to make the training process more accurate.

In order to obtain the optimal interception policy, this embodiment designs the corresponding reward function, which can ensure that the unmanned surface vessels can obtain the appropriate reward when interacting with the MADDPG network structure, and finally learn the interception policy that can make the unmanned surface vessel obtain the maximum reward value, that is, the required optimal interception policy. The reward function is as follows:

Under the set task background, all unmanned surface vessels in the unmanned surface vessel group can place a guard target (high-value ship) and the intruding target on the opposite sides, and the reward function is as follows:

$$r_1 = \min_{b_j}(y'_{u_i,b_j}(t) - y'_{u_i,b_j}(t+1)),$$

where, $u_i$ is the unmanned surface vessel, $b_j$ is the intruding target, $y'_{u_i,b_j}(t)$ is the distance between the intruding target and the unmanned surface vessel at the $t^{th}$ moment, $y'_{u_i,b_j}(t+1)$ is the distance between the intruding target and the unmanned surface vessel at the $(t+1)^{th}$ moment.

Various embodiments in the present description are described in a progressive manner, and each embodiment focuses on differences from other embodiments, and the same and similar parts among various embodiments can be referred to each other. The system disclosed in the embodiment corresponds to the method disclosed in the embodiment and thus is briefly described, and the relevant parts can refer to the portion of the method.

In various embodiments, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

The principles and implementations of the present disclosure are set forth herein with specific embodiments, and the description of the above embodiments is merely used to help understanding the method and core concepts of the present disclosure. Meanwhile, according to the concepts of the present disclosure, a person of ordinary skill in the art may make some changes in both the specific implementation and application scope. In conclusion, the contents of the present description should not be construed as limiting the present disclosure.

The invention claimed is:

1. A control method for collaborative interception by a plurality of unmanned surface vessels, which is performed in a computer, comprising:
   obtaining task environment information of each unmanned surface vessel in an unmanned surface vessel group at a current moment; wherein the task environment information comprises position information of the unmanned surface vessel, velocity information of the unmanned surface vessel, relative position information between the unmanned surface vessel and an intruding target, and relative velocity information between the unmanned surface vessel and the intruding target; each unmanned surface vessel corresponds to an intruding target interception policy output model, and the intruding target interception policy output model is obtained by training a multi-agent deep deterministic policy gradient network structure based on a training sample;
   estimating interception point information of the intruding target at the current moment by using a Kalman filter according to the task environment information of all unmanned surface vessels at the current moment; wherein the interception point information comprises a predicted position of the intruding target and a predicted velocity of the intruding target;
   determining process state information of each unmanned surface vessel at the current moment; wherein the process state information comprises the position information of the unmanned surface vessel, the velocity information of the unmanned surface vessel and the interception point information of the intruding target; and
   inputting the process state information of each unmanned surface vessel at the current moment into a corresponding intruding target interception policy output model respectively to obtain an execution action of each unmanned surface vessel at a next moment, and sending the execution action to an execution structure of a corresponding unmanned surface vessel to intercept the intruding target.

2. The control method of claim 1, wherein before obtaining the task environment information of each unmanned surface vessel in the unmanned surface vessel group at the current moment, the control method further comprises:
   determining whether there is an intruding target in a navigation area corresponding to the unmanned surface vessel group at the current moment;
   when there is not an intruding target in the navigation area corresponding to the unmanned surface vessel group at the current moment, determining whether there is an intruding target in a navigation area corresponding to the unmanned surface vessel group at the next moment; and
   when there is an intruding target in the navigation area corresponding to the unmanned surface vessel group at the current moment, obtaining the task environment information of each unmanned surface vessel in the unmanned surface vessel group at the current moment.

3. The control method of claim 1, wherein the estimating the interception point information of the intruding target at the current moment by using the Kalman filter according to the task environment information of all unmanned surface vessels at the current moment comprises:
   determining predicted interception point information of the intruding target at the current moment by using the Kalman filter according to interception point information of the intruding target at a previous moment;
   abstracting all unmanned surface vessels into particles moving on a two-dimensional plane, and determining a position measurement value and a velocity measurement value of the intruding target in a Cartesian coordinate system according to the task environment information of all unmanned surface vessels at the current moment; and
   correcting the predicted interception point information of the intruding target at the current moment by using the Kalman filter according to the position measurement value and the velocity measurement value to determine the interception point information of the intruding target at the current moment.

4. The control method of claim 1, wherein constructing the intruding target interception policy output model comprises:
   determining a training sample of an $i^{th}$ unmanned surface vessel; wherein the training sample is a data set continuous in time; the data set comprises a plurality of sample sets; each sample set comprises a plurality of elements, which are respectively the process state information at the current moment, an execution action at the current moment, a reward at the current moment and process state information at the next moment;
   constructing the multi-agent deep deterministic policy gradient network structure; and
   inputting the training sample of the $i^{th}$ unmanned surface vessel into the multi-agent deep deterministic policy gradient network structure to train the multi-agent deep deterministic policy gradient network structure, so as to obtain the intruding target interception policy output model corresponding to the $i^{th}$ unmanned surface vessel, and thus obtain the intruding target interception policy output model corresponding to each unmanned surface vessel.

5. The control method of claim 4, wherein the determining the training sample of the $i^{th}$ unmanned surface vessel comprises:
   obtaining task environment information of each unmanned surface vessel in the unmanned surface vessel group at a $t^{th}$ moment;
   estimating interception point information of the intruding target at the $t^{th}$ moment by using the Kalman filter according to the task environment information of all unmanned surface vessels at the $t^{th}$ moment; wherein the interception point information comprises the predicted position of the intruding target and the predicted velocity of the intruding target;
   determining process state information of the $i^{th}$ unmanned surface vessel at the $t^{th}$ moment according to the task environment information of the $i^{th}$ unmanned surface vessel at the $t^{th}$ moment and the interception point information of the intruding target at the $t^{th}$ moment;

obtaining an execution action of the $i^{th}$ unmanned surface vessel at the $t^{th}$ moment;

calculating a reward of the $i^{th}$ unmanned surface vessel at the $t^{th}$ moment according to a formula of $$r_1 = \min_{b_j}(y'_{u_i,b_j}(t) - y'_{u_i,b_j}(t+1));$$

wherein $r_1$ is the reward of the $i^{th}$ unmanned surface vessel at the $t^{th}$ moment, $U_i$, is the $i^{th}$ unmanned surface vessel, $b_j$ is a $j^{th}$ intruding target, $y'_{u_i, b_j}(t)$ is a distance between the $j^{th}$ intruding target and the $i^{th}$ unmanned surface vessel at the $t^{th}$ moment, $y'_{u_i, b_j}(t+1)$ is a distance between the $j^{th}$ intruding target and the $i^{th}$ unmanned surface vessel at a $(t+1)^{th}$ moment;

obtaining task environment information of each unmanned surface vessel in the unmanned surface vessel group at the $(t+1)^{th}$ moment;

estimating interception point information of the intruding target at the $(t+1)^{th}$ moment by using the Kalman filter according to the task environment information of all unmanned surface vessels at the $(t+1)^{th}$ moment; wherein the interception point information comprises the predicted position of the intruding target and the predicted velocity of the intruding target;

determining process state information of the $i^{th}$ unmanned surface vessel at the $(t+1)^{th}$ moment according to the task environment information of the $i^{th}$ unmanned surface vessel at the $(t+1)^{th}$ moment and the interception point information of the intruding target at the $(t+1)^{th}$ moment;

combining the process state information of the $i^{th}$ unmanned surface vessel at the $t^{th}$ moment, the execution action of the $i^{th}$ unmanned surface vessel at the $t^{th}$ moment, the reward of the $i^{th}$ unmanned surface vessel at the $t^{th}$ moment, and the process state information of the $i^{th}$ unmanned surface vessel at the $(t+1)t^{th}$ moment into a sample set of the $i^{th}$ unmanned surface vessel at the $t^{th}$ moment;

storing the sample set of the $i^{th}$ unmanned surface vessel at the $t^{th}$ moment in an experience pool; and stopping storing when data stored in the experience pool reach a set amount; wherein the data in the experience pool after stopping storing are the training sample of the $i^{th}$ unmanned surface vessel.

6. A control system for collaborative interception by a plurality of unmanned surface vessels, comprising:
a processor, and
a memory having program instructions stored,
wherein when the processor executes the program instructions stored on the memory, the processor is configured to:
obtain task environment information of each unmanned surface vessel in an unmanned surface vessel group at a current moment; wherein the task environment information comprises position information of the unmanned surface vessel, velocity information of the unmanned surface vessel, relative position information between the unmanned surface vessel and an intruding target, and relative velocity information between the unmanned surface vessel and the intruding target; each unmanned surface vessel corresponds to an intruding target interception policy output model; and the intruding target interception policy output model is obtained by training a multi-agent deep deterministic policy gradient network structure based on a training sample;

estimate interception point information of the intruding target at the current moment by using a Kalman filter according to the task environment information of all unmanned surface vessels at the current moment; wherein the interception point information comprises a predicted position of the intruding target and a predicted velocity of the intruding target;

determine process state information of each unmanned surface vessel at the current moment; wherein the process state information comprises the position information of the unmanned surface vessel, the velocity information of the unmanned surface vessel and the interception point information of the intruding target; and input the process state information of each unmanned surface vessel at the current moment into a corresponding intruding target interception policy output model respectively to obtain an execution action of each unmanned surface vessel at a next moment, and send the execution action to an execution structure of a corresponding unmanned surface vessel to intercept the intruding target.

7. The control system of claim 6, wherein the processor is further configured to:
determine whether there is an intruding target in a navigation area corresponding to the unmanned surface vessel group at the current moment;
determine whether there is an intruding target in a navigation area corresponding to the unmanned surface vessel group at the next moment when there is not an intruding target in the navigation area corresponding to the unmanned surface vessel group at the current moment; and
enter the current moment task environment information obtaining module when there is an intruding target in the navigation area corresponding to the unmanned surface vessel group at the current moment.

8. The control system of claim 6, wherein the the processor is further configured to:
determine predicted interception point information of the intruding target at the current moment by using the Kalman filter according to interception point information of the intruding target at a previous moment;
abstract all unmanned surface vessels into particles moving on a two-dimensional plane, and determine a position measurement value and a velocity measurement value of the intruding target in a Cartesian coordinate system according to the task environment information of all unmanned surface vessels at the current moment; and
correct the predicted interception point information of the intruding target at the current moment by using the Kalman filter according to the position measurement value and the velocity measurement value to determine the interception point information of the intruding target at the current moment.

9. The control system of claim 6, wherein the processor is further configured to:
determine a training sample of an $i^{th}$ unmanned surface vessel; wherein the training sample is a data set continuous in time; the data set comprises a plurality of sample sets; each sample set comprises a plurality of elements, which are respectively process state information at the current moment, an execution action at the current moment, a reward at the current moment and process state information at the next moment;

construct the multi-agent deep deterministic policy gradient network structure; and input the training sample of the $i^{th}$ unmanned surface vessel into the multi-agent deep deterministic policy gradient network structure to train the multi-agent deep deterministic policy gradient network structure, so as to obtain the intruding target interception policy output model corresponding to the $i^{th}$ unmanned surface vessel, and thus obtain the intruding target interception policy output model corresponding to each unmanned surface vessel.

10. The control system of claim 9, wherein the processor is further configured to:

obtain task environment information of each unmanned surface vessel in the unmanned surface vessel group at a $t^{th}$ moment;

estimate interception point information of the intruding target at the $t^{th}$ moment by using the Kalman filter according to the task environment information of all unmanned surface vessels at the $t^{th}$ moment; wherein the interception point information comprises the predicted position of the intruding target and the predicted velocity of the intruding target;

determine process state information of the $i^{th}$ unmanned surface vessel at the $t^{th}$ moment according to the task environment information of the $i^{th}$ unmanned surface vessel at the $t^{th}$ moment and the interception point information of the intruding target at the $t^{th}$ moment;

obtain an execution action of the $i^{th}$ unmanned surface vessel at the $t^{th}$ moment;

calculate a reward of the $i^{th}$ unmanned surface vessel at the $t^{th}$ moment according to a formula of $$r_1 = \min_{b_j}\left(y'_{u_i,b_j}(t) - y'_{u_i,b_j}(t+1)\right);$$

wherein $r_l$ is the reward of the $i^{th}$ unmanned surface vessel at the $t^{th}$ moment, $U_i$, is the $i^{th}$ unmanned surface vessel, $b_j$ is a $j^{th}$ intruding target, $y'_{u_i, b_j}(t)$ is a distance between the $j^{th}$ intruding target and the $i^{th}$ unmanned surface vessel at the $t^{th}$ moment, $_j+1)$ is a distance between the Pt intruding target and the $it^h$ unmanned surface vessel at a $(t+1)^{th}$ moment;

obtain task environment information of each unmanned surface vessel in the unmanned surface vessel group at the $(t+1)^{th}$ moment;

estimate interception point information of the intruding target at the $(t+1)^{th}$ moment by using the Kalman filter according to the task environment information of all unmanned surface vessels at the $(t+1)^{th}$ moment; wherein the interception point information comprises the predicted position of the intruding target and the predicted velocity of the intruding target;

determine process state information of the $i^{th}$ unmanned surface vessel at the $(t+1)^{th}$ moment according to the task environment information of the $i^{th}$ unmanned surface vessel at the $(t+1)^{th}$ moment and the interception point information of the intruding target at the $(t+1)^{th}$ moment;

combine the process state information of the $i^{th}$ unmanned surface vessel at the $t^{th}$ moment, the execution action of the $i^{th}$ unmanned surface vessel at the $t^{th}$ moment, the reward of the $i^{th}$ unmanned surface vessel at the $t^{th}$ moment, and the process state information of the $i^{th}$ unmanned surface vessel at the $(t+1)^{th}$ moment into a sample set of the $i^{th}$ unmanned surface vessel at the the $(t+1)^{th}$ moment;

store the sample set of the $i^{th}$ unmanned surface vessel at the $t^{th}$ moment in an experience pool; and stop storing when data stored in the experience pool reach a set amount; wherein the data in the experience pool after stopping storing are the training sample of the $i^{th}$ unmanned surface vessel.

* * * * *